US012789670B2

(12) United States Patent
Tiemeyer

(10) Patent No.: US 12,789,670 B2
(45) Date of Patent: Nov. 10, 2026

(54) ELECTRIC VEHICLE COOLANT SYSTEM WITH MULTI-WAY VALVE CONTROL THROUGH CHILLER AND CHILLER BYPASS LINE

(71) Applicant: HELLA GmbH & Co. KGaA, Lippstadt (DE)

(72) Inventor: Sebastian Tiemeyer, Dortmund (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 142 days.

(21) Appl. No.: 18/818,424

(22) Filed: Aug. 28, 2024

(65) Prior Publication Data

US 2024/0416797 A1 Dec. 19, 2024

Related U.S. Application Data

(63) Continuation of application No. PCT/EP2023/050050, filed on Jan. 3, 2023.

(30) Foreign Application Priority Data

Feb. 28, 2022 (DE) ..................... 10 2022 104 740.7

(51) Int. Cl.
*B60L 58/26* (2019.01)
*B60K 1/00* (2006.01)

(52) U.S. Cl.
CPC ........ *B60L 58/26* (2019.02); *B60K 2001/005* (2013.01); *B60K 2001/006* (2013.01)

(58) Field of Classification Search
CPC ... B60L 58/24; B60L 58/26; B60K 2001/005; B60K 2001/006; B60K 11/02; H01M 10/625
See application file for complete search history.

(56) References Cited

U.S. PATENT DOCUMENTS 6,616,059 B2 * 9/2003 Sabhapathy .......... B60W 10/30 237/12.3 B
9,511,645 B2 * 12/2016 Johnston ............ B60H 1/32284
(Continued)

FOREIGN PATENT DOCUMENTS

CN 112477699 A 3/2021
CN 113715576 A 11/2021
(Continued)

OTHER PUBLICATIONS

International Search Report for International Application PCT/EP2023/050050 dated May 3, 2023.

*Primary Examiner* — Travis Ruby
(74) *Attorney, Agent, or Firm* — Muncy, Geissler, Olds & Lowe, P.C.

(57) ABSTRACT

A coolant system for an electric vehicle having components through which the coolant can flow, a chiller being one of the components. The components are interconnectable, via a multi-way valve and coolant lines, so as to conduct coolant. A chiller bypass line of the coolant system is arranged with respect to the chiller such that the chiller is connectable to the multi-way valve so as to conduct coolant. In a first switching state of the multi-way valve, the coolant can flow both through the chiller bypass line in a first flow direction and through the chiller, and, in a second switching state of the multi-way valve, the coolant can flow through the chiller bypass line in a second flow direction opposite to the first flow direction to bypass the chiller.

14 Claims, 8 Drawing Sheets

(56) References Cited

U.S. PATENT DOCUMENTS

| | | | | |
|---|---|---|---|---|
| 9,631,872 | B2 * | 4/2017 | Lombardo | B60H 1/00385 |
| 10,046,617 | B2 * | 8/2018 | Smith | B60H 1/00392 |
| 2009/0020620 | A1 * | 1/2009 | Douarre | B60H 1/039<br>237/12.3 R |
| 2014/0062228 | A1 * | 3/2014 | Carpenter | B60K 11/02<br>310/53 |
| 2015/0217622 | A1 * | 8/2015 | Enomoto | F16K 11/076<br>62/244 |
| 2016/0107503 | A1 * | 4/2016 | Johnston | B60H 1/00278<br>165/202 |
| 2016/0318370 | A1 * | 11/2016 | Rawlinson | B60H 1/32281 |
| 2017/0152957 | A1 * | 6/2017 | Roche | B60L 58/26 |
| 2019/0070924 | A1 * | 3/2019 | Mancini | B60H 1/32281 |
| 2019/0375270 | A1 * | 12/2019 | Boger | B60H 1/00392 |
| 2021/0387547 | A1 * | 12/2021 | Yang | B60H 1/00278 |
| 2023/0076418 | A1 * | 3/2023 | He | H05K 7/20881 |

FOREIGN PATENT DOCUMENTS

| | | | |
|---|---|---|---|
| WO | WO 2020246421 | A1 | 12/2020 |
| WO | WO 2021259513 | A1 | 12/2021 |

* cited by examiner

ELECTRIC VEHICLE COOLANT SYSTEM WITH MULTI-WAY VALVE CONTROL THROUGH CHILLER AND CHILLER BYPASS LINE

This nonprovisional application is a continuation of International Application No. PCT/EP2023/050050, which was filed on Jan. 3, 2023, and which claims priority to German Patent Application No. 10 2022 104 740.7, which was filed in Germany on Feb. 28, 2022, and which are both herein incorporated by reference.

BACKGROUND OF THE INVENTION

Field of the Invention

The present invention relates to a coolant system for an electric vehicle and a cooling system for an electric vehicle with a coolant system and a refrigerant circuit.

Description of the Background Art

Coolant for electric vehicles and cooling systems for electric vehicles are already known from the state of the art in numerous design variants.

This is the starting point for the invention at hand.

SUMMARY OF THE INVENTION

It is therefore an object of the present invention to improve a coolant system for an electric vehicle and a cooling system for an electric vehicle with a coolant system and a refrigerant circuit.

This object is achieved by a coolant system for electric vehicles, which is characterized in that the at least one valve is designed as merely a single multi-way valve, and a component bypass line of the coolant system is arranged with respect to at least one of the components through which the coolant can flow such that this component is connectable, by means of the component bypass line, to the multi-way valve so as to conduct coolant in such a way that, in a first switching state of the multi-way valve, the coolant can flow both through the component bypass line in a first flow direction and through this component, and, in a second switching state of the multi-way valve, the coolant can flow through the component bypass line in a second flow direction, opposite to the first flow direction, in the bypass to this component. The aforementioned component can be designed as any useful and suitable component of the coolant system of the invention, a component through which the coolant can flow. When a component is bypassed using the component bypass line, the coolant is conducted to this component in the bypass. Further, this problem is solved by a cooling system for electric vehicles.

An essential advantage of the invention is in particular that a coolant system for an electric vehicle and a cooling system for an electric vehicle with a coolant system and a refrigerant circuit are improved. Due to the invention, functionally complex coolant systems and cooling systems for electric vehicles can be realized in a simpler manner in terms of design and production technology. By means of the combination of the invention with the multi-way valve and the component bypass line, it is possible to use the component bypass line for different operating states of the coolant system of the invention, because the coolant can flow through the component bypass line in both basically possible flow directions. Accordingly, the number of coolant lines and valves is significantly reduced. At the same time, the efficiency of such coolant systems and cooling systems is increased by means of the invention, because the aforementioned systems enable a higher functional complexity, compared to the state of the art, with considerably fewer components. Accordingly, a plurality of operating states, therefore, operating modes of the system, can be realized with a simply constructed system with few components and coolant lines.

In principle, the cooling system of the invention for an electric vehicle and the coolant system of the invention for an electric vehicle are freely selectable within broad, suitable limits in terms of type, functionality, material, and dimensioning. The invention is also not limited to use in pure electric vehicles. For example, the invention can also be used advantageously in so-called hybrid vehicles.

The plurality of components can have at least one subset of the following components of a cooling system: coolant pump, battery, chiller, coolant heater, powertrain with an electric motor and power electronics for the electric motor, cooling air radiator for heat exchange with free surroundings, and condenser. The components mentioned can also be installed in a plurality of the respective components in the coolant system of the invention. This specifies essential components for a coolant system for the coolant system of the invention.

The plurality of components can have a chiller, wherein the component bypass line is designed as a chiller bypass line and the chiller is designed as the component that can be flowed around in the bypass in the second switching state of the multi-way valve by means of the component bypass line, preferably that a component outlet designed as a chiller outlet can be connected to the multi-way valve by means of the component bypass line so as to conduct coolant. In this way, the component and the component bypass line are realized in a particularly suitable manner. The battery in particular can be cooled by means of the chiller to a temperature range required for its function, despite adverse ambient and/or operating conditions of the electric vehicle. However, due to the invention, the chiller can also be used additionally thereto or alternatively thereto for other cooling tasks, for example, for cooling the power electronics and/or the electric motor. The waste heat generated during any cooling by means of the cooling system of the invention with the coolant system of the invention, therefore, also the waste heat of the chiller, can be used sensibly, depending on the switching state of the multi-way valve, to heat other areas of the vehicle, for example, a passenger compartment, or to heat other components of the coolant system. Of course, a release of this waste heat into the open surroundings, for example, by means of a cooling air radiator of the coolant system, is also conceivable.

The plurality of components can be arranged distributed over at least two coolant circuits of the coolant system, wherein the at least two coolant circuits are interconnectable by means of the multi-way valve so as to conduct coolant, preferably that, on the one hand, a first coolant pump and/or the battery and/or the chiller and/or the coolant heater are arranged in a first coolant circuit and/or, on the other hand, a second coolant pump and/or the powertrain and/or the cooling air radiator and/or the condenser are arranged in a second coolant circuit. In this way, it is possible to operate the at least two coolant circuits separately, on the one hand, or in coolant-conducting connection with each other, on the other hand. Of course, the present example also comprises examples of the invention with more than two coolant circuits.

The first coolant circuit can be designed as a battery subcircuit, with the chiller, the first coolant pump, the battery arranged downstream of the first coolant pump in the direction of flow, with respect to a flow of the coolant through the first coolant pump, and the second coolant circuit is designed as a drivetrain subcircuit, with the second coolant pump and the powertrain arranged downstream of the second coolant pump in the direction of flow, with respect to a flow of the coolant through the second coolant pump, and the cooling air radiator for cooling the coolant flowing in the drivetrain subcircuit with ambient air. As a result, the first and second coolant circuits are realized in a very advantageous manner.

The multi-way valve can be designed such that the coolant can flow through the drivetrain subcircuit without interruption in all possible switching states of the multi-way valve and when the multi-way valve is transferred from one of these switching states to another of these switching states. This ensures that the drivetrain subcircuit, and thus the power electronics and the electric motor, are cooled safely to the temperature required for their proper function under all ambient and operating conditions of the electric vehicle.

One end of the chiller bypass line can be arranged downstream of the chiller outlet and upstream of an inlet of the first coolant pump in the direction of flow, with respect to a flow of the coolant through the chiller and the first coolant pump, so as to conduct coolant. In this way, it is possible, on the one hand, to use the chiller without essentially simultaneous cooling of the battery, for example, for other cooling tasks. This is possible when the first coolant pump is switched off. When the first coolant pump is switched on, on the other hand, it is possible by means of this refinement, for example, for the coolant to flow through the battery by bypassing the chiller by means of the chiller bypass line, in contrast to the case where the coolant flows through the battery using the chiller.

A check valve can be additionally arranged in the battery subcircuit downstream of the battery in the direction of flow, with respect to a flow of the coolant through the battery, in such a way that the check valve only enables the coolant to flow from the battery in the direction of the multi-way valve. This makes it possible, for example, to simplify the design of the multi-way valve, as unwanted flow through the battery from the direction of the multi-way valve is effectively prevented by the check valve. Otherwise, therefore, if no such check valve is provided, this undesired flow of coolant through the battery must be prevented by means of the multi-way valve, therefore, in a switching state of the multi-way valve.

The battery subcircuit additionally can have a coolant heater for heating the battery as needed, wherein the coolant heater is arranged downstream of the multi-way valve and upstream of the chiller in the direction of flow, with respect to the flow of the coolant through the chiller, preferably that the chiller and the coolant heater are arranged in a common coolant line of the battery subcircuit, particularly preferably that the coolant heater is designed as an electric heater. In this way, the battery can also be heated if extreme ambient cold or the like is present. The example of this refinement moreover has the further advantage that not only the chiller, but also the coolant heater can be bypassed by means of the chiller bypass line in a simple way in terms of design and production technology. When bypassing at least one component, for example, the chiller and the coolant heater, the coolant is conducted to this component or these components in the bypass. Further, the coolant heater can be realized particularly advantageously according to an example; this applies in particular if the vehicle is an electric vehicle.

Depending on the switching state of the multi-way valve, the following coolant-conducting connections can be realized at least in one subset, preferably all, merely by means of the multi-way valve: a) coolant-conducting connection of the chiller to the battery, b) coolant-conducting connection of the chiller to the power electronics and the electric motor, c) coolant-conducting connection of the chiller to the cooling air radiator, the power electronics, and the electric motor, d) coolant-conducting connection of the chiller to the battery, the power electronics, and the electric motor, e) coolant-conducting connection of the chiller to the battery, the cooling air radiator, the power electronics, and the electric motor. As a result, the coolant system of the invention is particularly flexible and can therefore also be used for temperature control tasks that are very demanding per se in terms of circuitry in an electric vehicle. This applies in particular to the example of this refinement.

The advantages associated with the coolant system of the invention can also be used for the cooling system of the invention, comprising a coolant system and a refrigerant circuit for air conditioning a passenger compartment of the electric vehicle.

An advantageous refinement of the cooling system of the invention provides that the refrigerant circuit can be designed to air-condition a passenger compartment of the electric vehicle and/or to control the temperature of a coolant flowing in the coolant circuit. The refrigerant circuit can be used in a particularly advantageous way as a result.

The cooling system can be designed such that a heat transfer connection between the coolant system on one side and the refrigerant circuit on the other side can be established as needed by means of the chiller. In this way, in addition to the control of the temperature of the refrigerant circuit, therefore, a refrigerant flowing in the refrigerant circuit, a temperature control of the coolant system is enabled by means of the coolant in a very simple way in terms of design and production technology. The chiller is therefore a component of both the coolant system and the refrigerant circuit.

The cooling system can be designed such that a heat transfer connection between the coolant system on one side and the refrigerant circuit on the other side can be established as needed by means of the condenser, preferably that the condenser is arranged in the drivetrain subcircuit so as to conduct coolant. As a result, for example, a component present in a conventional refrigerant circuit for an electric vehicle, namely, the condenser, can be used both for operating the refrigerant circuit and for heat transfer between the coolant system on one side and the refrigerant circuit on the other side. Accordingly, advantages result that are comparable to those of the aforementioned refinement of the cooling system of the invention. In combination with the two mentioned refinements of the cooling system of the invention, the possibility moreover results to exchange even more energy between the coolant system and the refrigerant circuit. On the other hand, the flexibility of the cooling system of the invention is increased further thereby.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
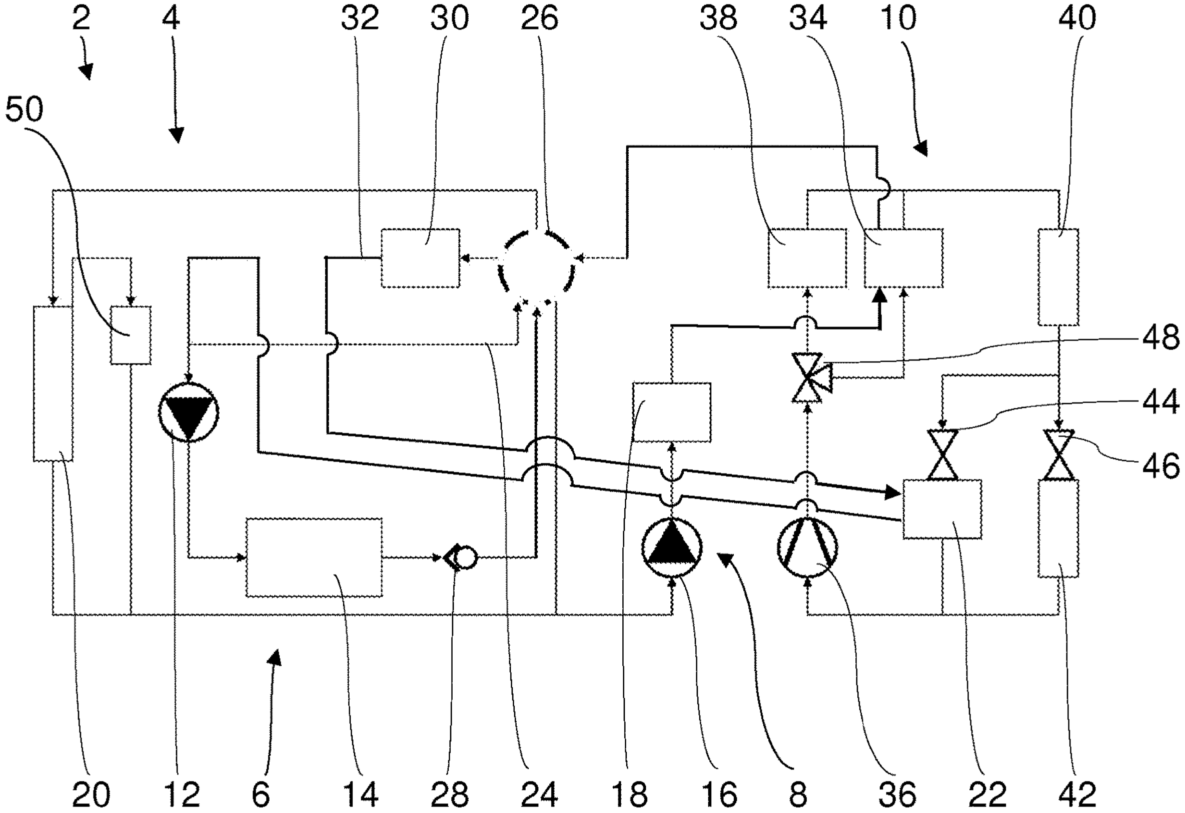
FIG. 1 shows an example of the cooling system of the invention with the coolant system of the invention in a process flow diagram.
Figure 2:
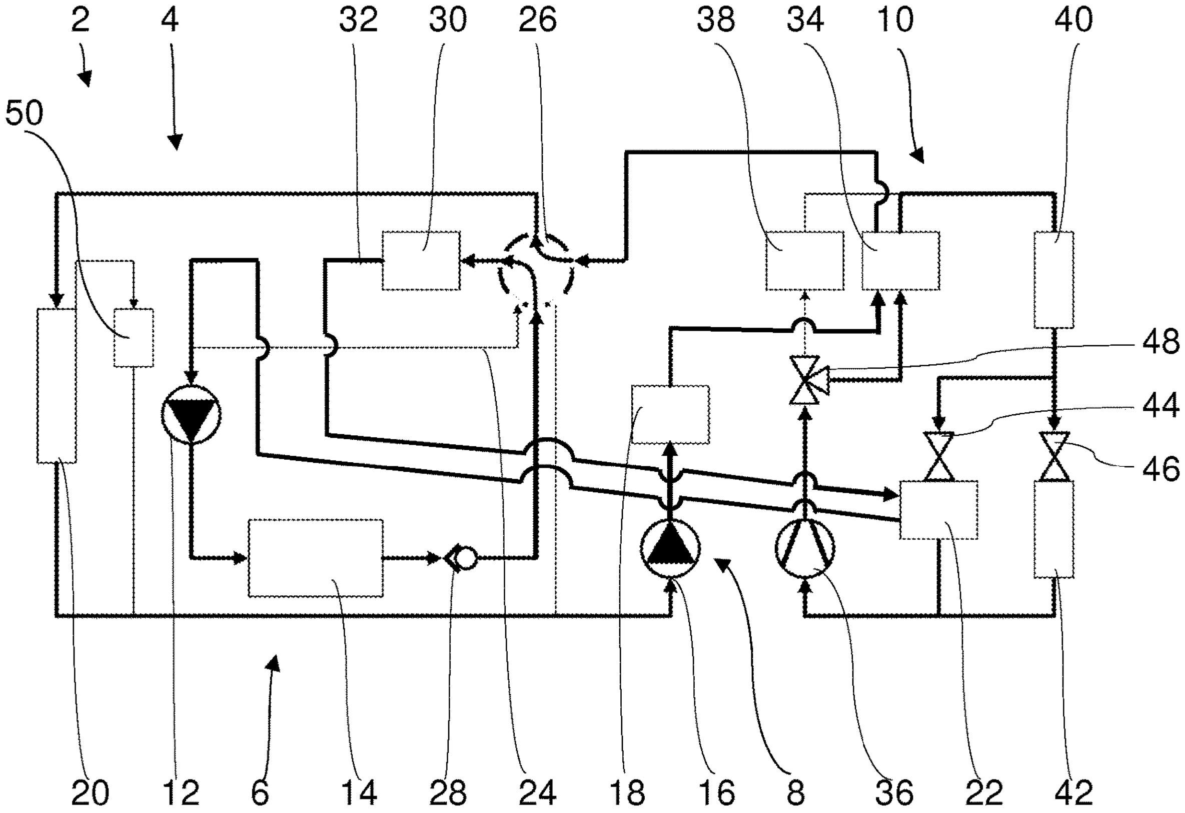
FIG. 2 shows the example in a representation analogous to FIG. 1, in a first operating state of the cooling system.
Figure 3:
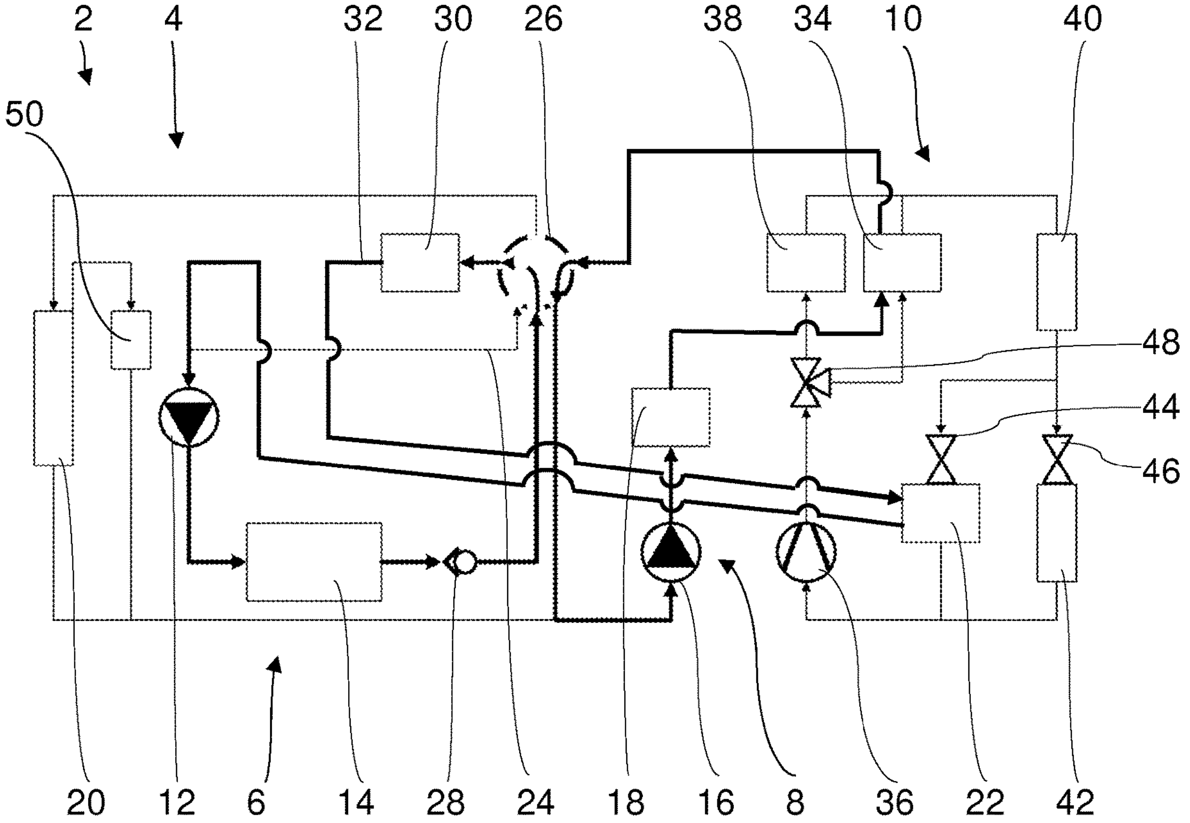
FIG. 3 shows the example in a representation analogous to FIG. 1, in a second operating state of the cooling system.
Figure 4:
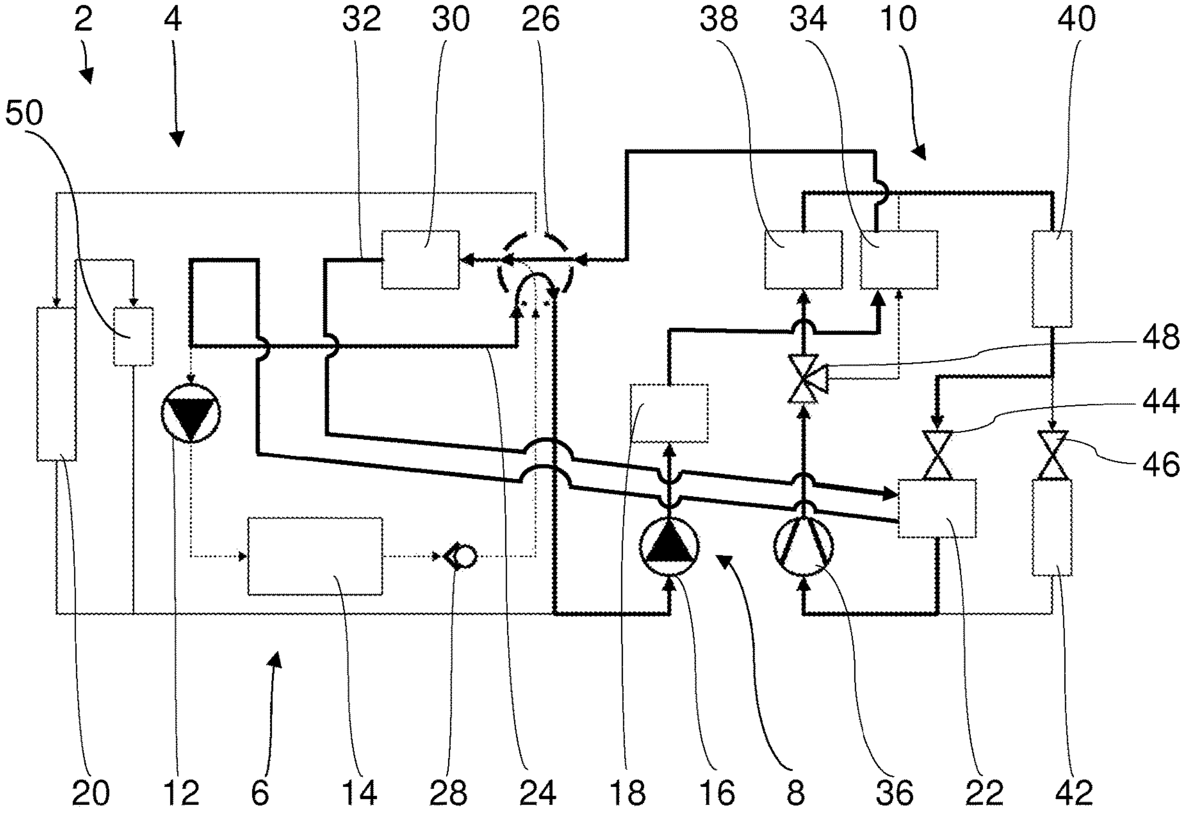
FIG. 4 shows the example in a representation analogous to FIG. 1, in a third operating state of the cooling system.

An example of the cooling system of the invention for an electric vehicle with the coolant system of the invention for an electric vehicle is shown in FIGS. 1 to 8 purely as an example.

The electric vehicle may be designed here as a pure electric vehicle.

Cooling system 2 for the electric vehicle comprises, on the one hand, a coolant system 4 with a first coolant circuit 6, designed as a battery subcircuit, and a second coolant circuit 8, designed as a drivetrain subcircuit, and, on the other hand, a refrigerant circuit 10 for air conditioning a passenger compartment of the electric vehicle, and for controlling the temperature of coolant system 4.

Coolant system 4 for circulating a liquid coolant comprises, on the one hand, battery subcircuit 6 with the following components of coolant system 4, namely, a first coolant pump 12 and a battery 14, arranged downstream of first coolant pump 12 in the direction of flow, with respect to the flow of coolant through first coolant pump 12, and, on the other hand, drivetrain subcircuit 8 with the following components of coolant system 4, namely, a second coolant pump 16 and a powertrain 18, arranged downstream of the second coolant pump 16 in the direction of flow, with respect to a flow of the coolant through second coolant pump 16, with power electronics and an electric motor, cooling air radiator 20 for cooling the coolant flowing in drivetrain subcircuit 8 with ambient air, and a coolant tank 50 for storing the coolant, wherein battery subcircuit 6 and drivetrain subcircuit 8 are interconnectable by means of at least one valve and coolant lines so as to conduct coolant.

Figure 5:
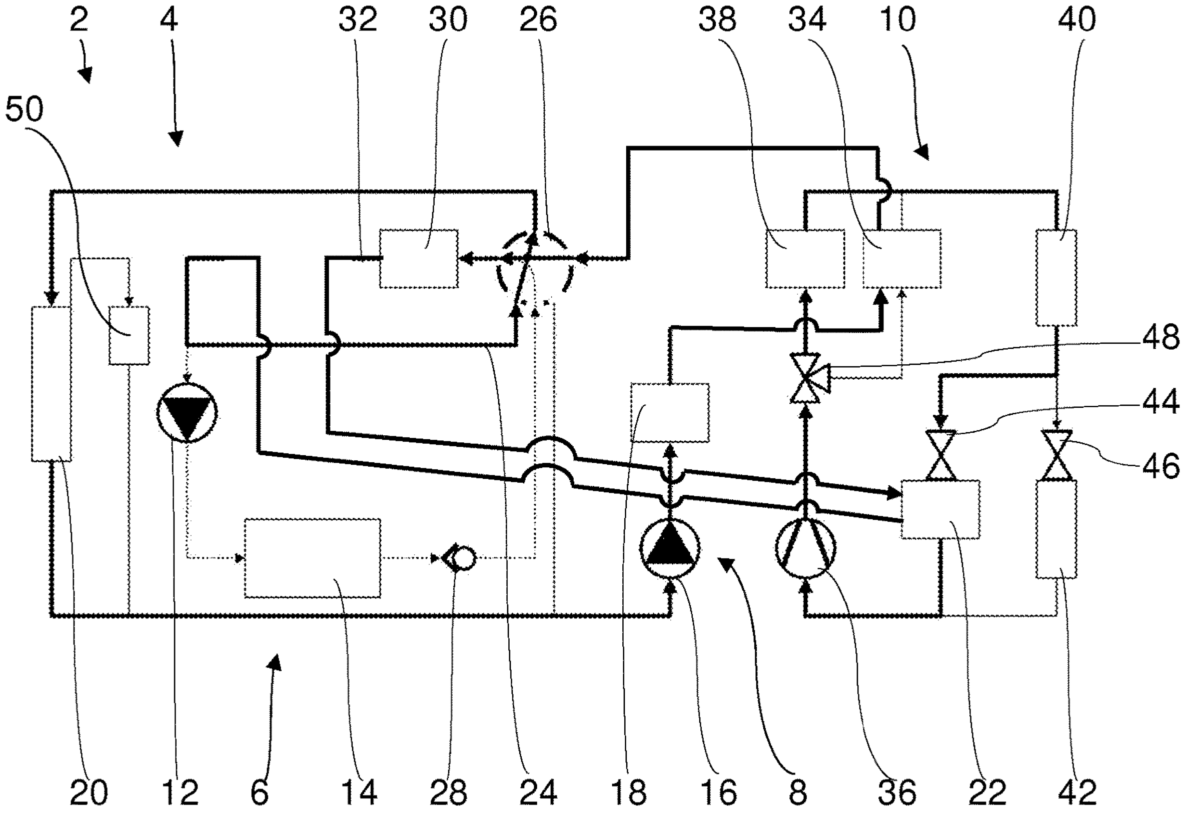
FIG. 5 shows the example in a representation analogous to FIG. 1, in a fourth operating state of the cooling system.
Figure 6:
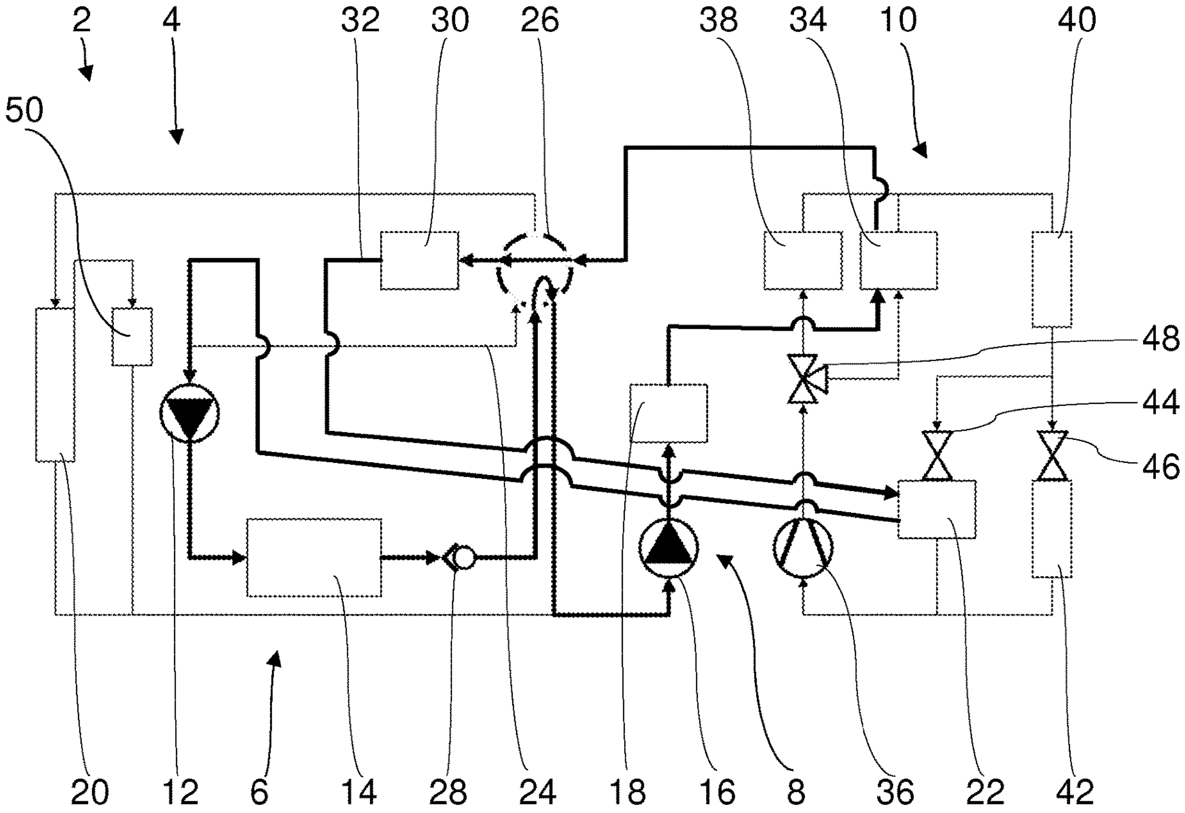
FIG. 6 shows the example in a representation analogous to FIG. 1, in a fifth operating state of the cooling system.
Figure 7:
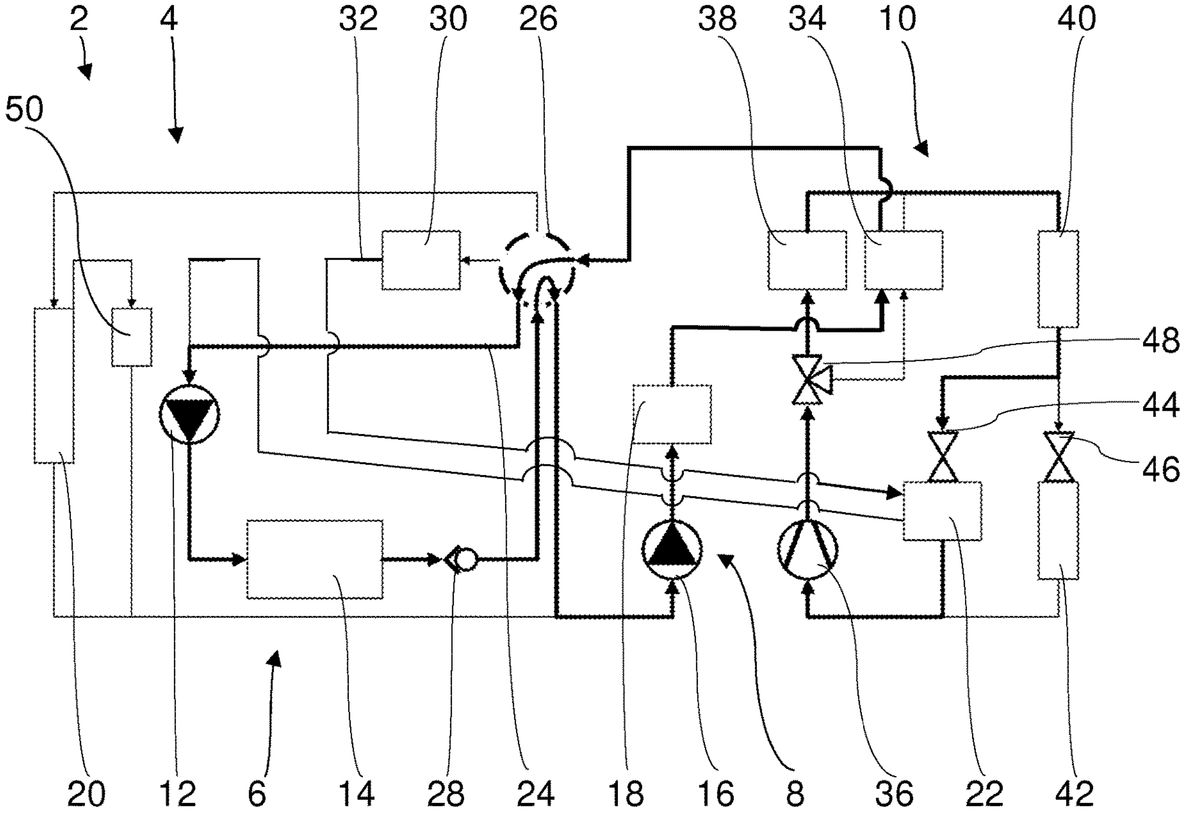
FIG. 7 shows the example in a representation analogous to FIG. 1, in a sixth operating state of the cooling system.
Figure 8:
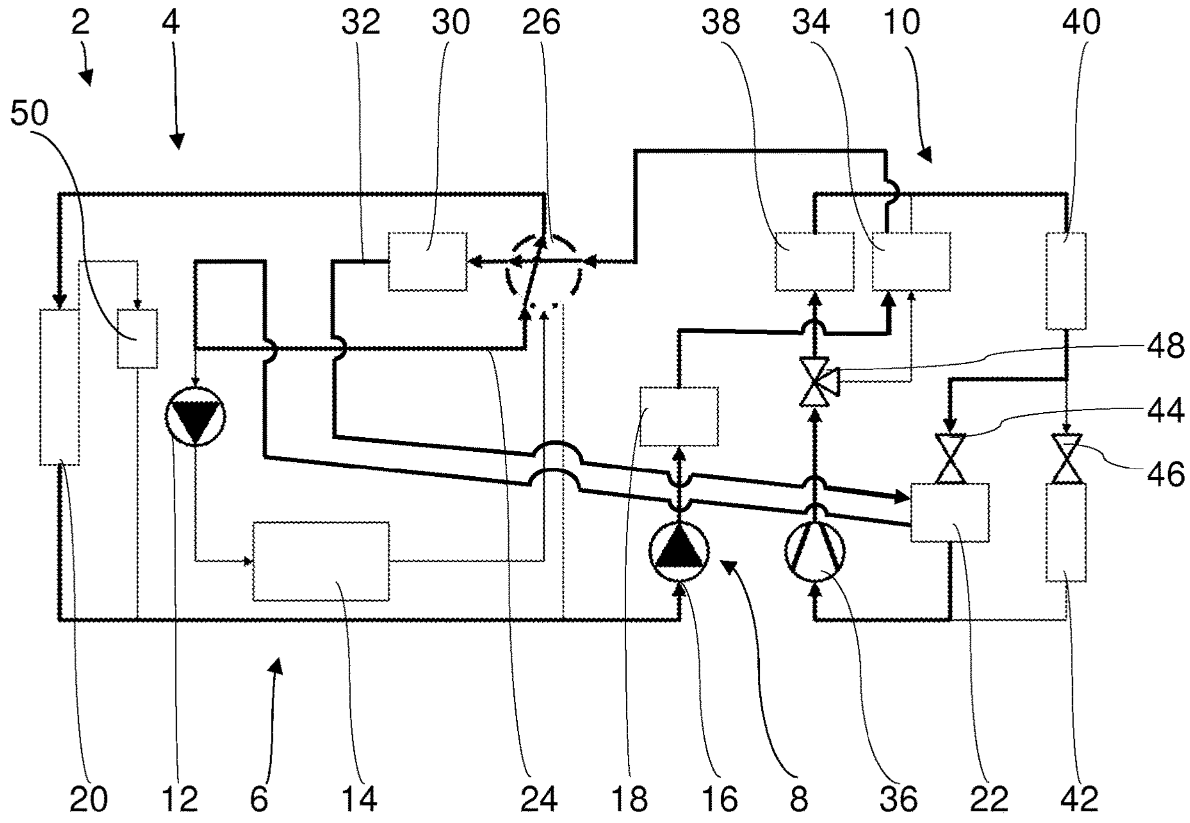
FIG. 8 shows the example in a representation analogous to FIG. 1, in a seventh operating state of the cooling system.

Moreover, coolant system 4 has at least one component 22, through which the coolant can flow and which is designed as a chiller, and a component bypass line 24 designed as a chiller bypass line. Further, the at least one valve is designed as merely a single multi-way valve 26, wherein a component outlet of chiller 22, designed as a chiller outlet, can be connected to multi-way valve 26 by means of chiller bypass line 24 so as to conduct coolant in such a way that the coolant can flow through both chiller bypass line 24 in a first flow direction and chiller 22 in a first switching state of multi-way valve 26, and the coolant can flow through chiller bypass line 24 in a second flow direction, opposite to the first flow direction, in the bypass to chiller 22 in a second switching state of the multi-way valve 26. See, for example, FIGS. 5 and 7 in this regard, wherein the first switching state of multi-way valve 26 is shown in FIG. 5 and the second switching state of multi-way valve 26 is shown in FIG. 7. Multi-way valve 26 can be designed in a variety of example suitable for the invention in terms of structure and production technology.

Thus, component 22 with the component outlet is designed as a chiller, arranged in battery subcircuit 6, with a chiller outlet, and component bypass line 24 is designed as a chiller bypass line, wherein in the second switching state of multi-way valve 26, the coolant can flow through battery 14 in the bypass to chiller 22 by means of chiller bypass line 24. One end of chiller bypass line 24 is arranged here downstream of the chiller outlet and upstream of an inlet of first coolant pump 12, in the flow direction, with respect to a flow of coolant through chiller 22 and first coolant pump 12, so as to conduct coolant, wherein battery 14 is arranged downstream of first coolant pump 12 in the flow direction, with respect to a flow of coolant through first coolant pump 12. Further, in battery subcircuit 6 according to FIGS. 1 to 7, with respect to a flow of the coolant through battery 14, a check valve 28 is additionally arranged downstream of battery 14 in the direction of flow in such a way that check valve 28 merely enables a flow of coolant from battery 14 in the direction of multi-way valve 26.

In contrast to this, however, variants of the coolant system of the invention, for example, coolant system 4, are also conceivable in which the aforementioned use of a check valve can be dispensed with. See in this regard, for example, FIG. 8, in which such a variant is shown purely as an example. In this variant according to FIG. 8, therefore, if no check valve is provided, the aforementioned undesired flow of coolant through battery 14 is prevented by means of multi-way valve 26, therefore, in a switching state of multi-way valve 26.

Multi-way valve 26 can be designed such that the coolant can flow through drivetrain subcircuit 8 without interruption in all possible switching states of multi-way valve 26 and when multi-way valve 26 is transferred from one of these switching states to another of these switching states.

Battery subcircuit 6 additionally can have a coolant heater 30, designed as an electric heater, for heating battery 14 as needed, wherein coolant heater 30 is arranged downstream of multi-way valve 26 and upstream of chiller 22 in the flow direction, with respect to a flow of coolant through chiller 22, and wherein chiller 22 and coolant heater 30 are arranged in a common coolant line 32 of battery subcircuit 6.

As is also evident from FIGS. 1 to 8, on the one hand, a heat transfer connection between coolant system 4 on one side and refrigerant circuit 10 on the other side can be established as needed by means of chiller 22. On the other hand, refrigerant circuit 10 here has a condenser 34, wherein cooling system 2 is designed such that a heat transfer connection between coolant system 4 on one side and refrigerant circuit 10 on the other side can be established as needed by means of condenser 34, alternatively or in addition to chiller 22. For this purpose, condenser 34 is arranged in drivetrain subcircuit 8 so as to conduct coolant.

In addition to chiller 22 and condenser 34, refrigerant circuit 10 also has the following additional components: a compressor 36, a further condenser 38, a dryer 40, an evaporator 42, as well as two expansion valves 44, 46 and a switching valve 48. The aforementioned components of refrigerant circuit 10 are interconnected here as shown in FIGS. 1 to 8 and interact with each other in the usual way as a heat pump for the purpose of air conditioning the passenger compartment of the electric vehicle.

Coolant system 4 is designed here in such a way that, depending on the switching state of multi-way valve 26, all of the following coolant-conducting connections can only be realized by means of multi-way valve 26: a) coolant-conducting connection of chiller 22 to battery 14, b) coolant-conducting connection of chiller 22 to powertrain 18, therefore, to the power electronics and the electric motor, c) coolant-conducting connection of chiller 22 to cooling air radiator 20 and powertrain 18, therefore, the power electronics and the electric motor, d) coolant-conducting connection of chiller 22 to battery 14 and powertrain 18, therefore, the power electronics and the electric motor, e) coolant-conducting connection of chiller 22 to battery 14, cooling air radiator 20, and powertrain 18, therefore, the power electronics and the electric motor. This will be explained in more detail with reference to FIGS. 2 to 8.

The mode of operation of the cooling system of the invention with the coolant system of the invention according to the present example will be explained in more detail hereinbelow with reference to FIGS. 1 to 8.

Depending on the operating state of cooling system 2, therefore, of battery subcircuit 6, drivetrain subcircuit 8, and refrigerant circuit 10, and taking into account the driving situation and the ambient temperature, the aforementioned circuits can represent heat sources or heat sinks of cooling system 2.

The efficiency of the overall system, therefore, cooling system 2, can be improved by a demand-oriented connecting or disconnecting the individual aforementioned coolant circuits. According to the invention, this is done in a particularly simple way in terms of design and production technology, with a simultaneously high efficiency of the overall system.

For example, during driving, battery 14 can be efficiently warmed up in the cold state by the waste heat from powertrain 18, namely, the power electronics and the electric motor. For this purpose, battery subcircuit 6 must be connected to the power electronics and the electric motor, therefore, powertrain 18, so as to conduct coolant. At very high ambient temperatures, however, a separation of battery and drivetrain subcircuits 6, 8 is absolutely necessary, so that the heat-sensitive battery 14 exclusively can be cooled by means of chiller 22. In particular, heating the interior, therefore, the passenger compartment, is a major challenge, because powertrain 18 in an electric vehicle usually generates too little waste heat compared to a vehicle with an internal combustion engine. For this reason, chiller 22 is used to supply heat from all available heat sources of cooling system 2 to refrigerant circuit 10, therefore, the heat pump. Accordingly, the waste heat from battery 14, powertrain 18, or from ambient air, which is transferred to the coolant by means of cooling air radiator 20, must be supplied to chiller 22, depending on availability, by creating a coolant-conducting connection between these components.

In order to be able to optimally combine the waste heat from battery 14 and/or powertrain 18 and/or from the ambient air, taking into account all conceivable driving conditions and ambient conditions, a large number of coolant-conducting connections are required between battery 14, powertrain 18, cooling air radiator 20, and chiller 22. This is enabled according to the invention with a simultaneously low structural complexity of cooling system 2, therefore, with a simultaneously low number of required coolant lines and valves. Cooling system 2 is shown in FIG. 1, with which the above-mentioned combinations a) to e) for using different heat sources of cooling system 2 are possible.

Because coolant heater 30 is arranged upstream of chiller 22 in the flow direction, with respect to a flow of coolant through coolant heater 30, its heat can be transferred to refrigerant circuit 10 at any time in addition to the waste heat via chiller 22. In addition, it is possible to bypass chiller 22 using chiller bypass line 24, so that powertrain 18 and battery 14 can be connected directly so as to conduct coolant. This can be used, for example, to operate refrigerant circuit 10 in a so-called triangular process. The high flexibility with regard to waste heat utilization and the other required operating modes, therefore, operating states of cooling system 2, would otherwise require at least three standard coolant valves, which would increase system costs and the total pressure loss and thus would simultaneously reduce the system efficiency. According to the invention, as realized in the example, the structural system complexity is greatly reduced and the system efficiency is significantly improved.

The combination of the components of cooling system 2 according to the invention, in particular multi-way valve 26, chiller 22, and chiller bypass line 24, enables the following six operating modes of cooling system 2.

In a first operating state of cooling system 2 and a corresponding switching state of multi-way valve 26, battery 14 is cooled separately via chiller 22, whereas powertrain 18 is connected to cooling air radiator 20 in a coolant circuit parallel thereto. See FIG. 2 in this regard. The coolant lines of coolant system 4 through which coolant flows or the coolant lines of refrigerant circuit 10 through which refrigerant flows are each shown in bold in FIGS. 1 to 8. This first operating state of cooling system 2 corresponds to the above-mentioned coolant-conducting connection 'a'.

In a second operating state of cooling system 2, which is an alternative to the aforementioned waste heat utilization case, with a corresponding switching state of multi-way valve 26, battery 14 is heated separately via coolant heater 30, whereas powertrain 18 is connected to multi-way valve 26 in a parallel coolant circuit, bypassing cooling air radiator 20. See FIG. 3 in this regard. This second operating state of cooling system 2 also corresponds to the above-mentioned coolant-conducting connection 'a'.

In a third operating state of cooling system 2 with a corresponding switching state of multi-way valve 26, battery subcircuit 6 and drivetrain subcircuit 8 are realized in parallel, bypassing cooling air radiator 20, but are coupled via chiller 22. In this case, chiller 22 functions as a mixing section, which means that the coolant flows of the two aforementioned coolant circuits overlap and mix in chiller 22. See FIG. 4 in this regard. The coolant flow in battery subcircuit 6 is shown using dotted lines for easier differentiation. Accordingly, the third operating state of cooling system 2 corresponds both to the aforementioned coolant-conducting connection b and simultaneously to the aforementioned coolant-conducting connection d. If both coolant pumps 12, 16 are in operation, this third operating mode of cooling system 2 corresponds to the coolant-conducting connection d. If first coolant pump 12 is switched off, this thus results in the coolant-conducting connection b.

In a fourth operating state of cooling system 2 with a corresponding switching state of multi-way valve 26, battery subcircuit 6 and drivetrain subcircuit 8 are realized in parallel, but are again coupled via chiller 22. This again functions as a mixing section, which means that the coolant flows of the two aforementioned circuits overlap and mix in chiller 22. In drivetrain subcircuit 8, the corresponding coolant flow is then directed through cooling air radiator 20. See FIG. 5 in this regard. The coolant flow in battery subcircuit 6 is again shown using dotted lines for the sake of clarity. If both coolant pumps 12, 16 are in operation, this operating mode corresponds to the aforementioned coolant-conducting connection e. If first coolant pump 12 is switched off, this results in the aforementioned coolant-conducting connection c. Based on the operating state shown according to FIG. 5, reference is made here as an example to the flow through chiller bypass line 24 in the first flow direction, therefore, from chiller 24 in the direction of multi-way valve 26. See also the related explanations on the example according to FIG. 7 in this regard.

In a fifth operating state of cooling system 2 with the corresponding switching state of multi-way valve 26, battery subcircuit 6 and drivetrain subcircuit 8 form a common coolant circuit with chiller 22. Cooling air radiator 20 is not connected in a coolant-conducting manner. See FIG. 6 in this regard. This fifth operating state corresponds to the aforementioned coolant-conducting connection d.

In a sixth operating state of cooling system 2 with a corresponding switching state of multi-way valve 26, battery subcircuit 6 and drivetrain subcircuit 8 form a common coolant circuit, wherein the coolant flow bypasses chiller 22 by means of chiller bypass line 24. Cooling air radiator 20 is also not connected here in a coolant-conducting manner. See FIG. 7 in this regard. Based on the present operating state according to FIG. 7, reference is made here as an example to the flow through chiller bypass line 24 in the second flow direction, therefore, from multi-way valve 26 in the direction of battery 14. See also the related explanations on the example according to FIG. 5 in this regard.

Check valve 28 in battery subcircuit 6 is only required for the fourth operating state of cooling system 2 according to FIG. 5 when first coolant pump 12 is switched off, which corresponds to the aforementioned coolant-conducting connection c, as otherwise an unintentional flow through battery 14 from multi-way valve 26 in the direction of battery 14 would be possible. According to the variant of cooling system 2 already explained above, the seventh operating state of cooling system 2, which is an alternative to the fourth operating state, provides that the coolant return from multi-way valve 26 into battery 14 is prevented by means of multi-way valve 26, therefore, by means of a switching state of multi-way valve 26 corresponding to the seventh operating state of cooling system 2. See FIG. 8 in this regard. In the last-mentioned variant of cooling system 2 according to FIG. 8, the check valve can therefore be completely omitted. If in other examples of the cooling system of the invention or the coolant system of the invention an operating state analogous to the aforementioned fourth operating state is not required, the aforementioned check valve can be omitted without replacement. Accordingly, an adjustment of the multi-way valve analogous to the seventh operating state would then also not be necessary.

Due to the invention, the functionally complex cooling system 2 for an electric vehicle with coolant system 4 can be realized in a simple manner in terms of design and production technology. By means of the combination of the invention with multi-way valve 26 and the component bypass line 24, it is possible to use the component bypass line 24 for different operating states of coolant system 4, because the coolant can flow through the component bypass line 24 in both basically possible flow directions. Accordingly, the number of coolant lines and valves is significantly reduced. At the same time, the efficiency is increased by means of cooling system 2, as coolant system 4 of cooling system 2 enables a higher functional complexity, compared to the state of the art, with significantly fewer components. Accordingly, a large number of operating states, therefore, operating modes of cooling system 2, can be realized with the simply constructed cooling system 2, in particular the simply constructed coolant system 4.

The invention is not limited to the present example. See, for example, the relevant explanations in the introduction to the description in this regard. In contrast to the explained example, in other example of the invention it may be provided, for example, that there is no condenser analogous to condenser 34 of the example. Instead, the refrigerant circuit can merely have a condenser analogous to condenser 38 of the example. Further, it is conceivable that the component according to the characteristic of claim 1 is not designed as a chiller of the battery subcircuit, but as another component of the coolant system of the invention. In the last-mentioned example as well, it is of course in accordance with the invention if a chiller is also used in the battery subcircuit in addition to the component with the component bypass line.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A coolant system for an electric vehicle for circulating a liquid coolant, the coolant system comprising:

at least one valve, the at least one valve being a single multi-way valve;

components through which the coolant is adapted to flow, the components being interconnectable via the multi-way valve and coolant lines, so as to conduct coolant, wherein the components include a first coolant pump, a second coolant pump, a battery, a chiller, a coolant heater, a powertrain with an electric motor and power electronics for the electric motor, a cooling air radiator for heat exchange with free surroundings, and a condenser; and a chiller bypass line of the coolant system that is arranged with respect to the chiller through which the coolant flows such that the chiller is connectable, via the chiller bypass line, to the multi-way valve so as to conduct coolant such that, in a first switching state of the multi-way valve, the coolant flows both through the chiller bypass line in a first flow direction and through the chiller, and, in a second switching state of the multi-way valve, the coolant flows through the chiller bypass line in a second flow direction, opposite to the first flow direction, to bypass the chiller.

2. The coolant system according to claim 1, wherein a chiller outlet of the chiller is connectable to the multi-way valve via the chiller bypass line in the first switching state so as to conduct coolant.

3. The coolant system according to claim 2, wherein the components are distributed over at least two coolant circuits of the coolant system, wherein the at least two coolant circuits include a first coolant circuit and a second coolant circuit that are interconnectable via the multi-way valve so as to conduct coolant, wherein the first coolant pump, the battery, the chiller and the coolant heater are arranged in the first coolant circuit, and wherein the second coolant pump, the powertrain, the cooling air radiator and the condenser are arranged in the second coolant circuit.

4. The coolant system according to claim 3, wherein the first coolant circuit is a battery subcircuit, with the chiller, the first coolant pump, and the battery arranged downstream of the first coolant pump in a direction of flow, with respect to a flow of the coolant through the first coolant pump, and wherein the second coolant circuit is a drivetrain subcircuit, with the second coolant pump, the powertrain arranged downstream of the second coolant pump in a direction of flow, with respect to a flow of the coolant through the second coolant pump, and the cooling air radiator for cooling the coolant flowing in the drivetrain subcircuit with ambient air.

5. The coolant system according to claim 4, wherein the multi-way valve is designed such that the coolant flows through the drivetrain subcircuit without interruption in all possible switching states of the multi-way valve and when the multi way valve is transferred from one of these switching states to another of these switching states.

6. The coolant system according to claim 4, wherein one end of the chiller bypass line is arranged downstream of the chiller outlet and upstream of an inlet of the first coolant pump in the direction of flow, with respect to a flow of coolant through the chiller and the first coolant pump, so as to conduct coolant.

7. The coolant system according to claim 4, wherein a check valve is additionally arranged in the battery subcircuit downstream of the battery in the direction of flow, with respect to a flow of the coolant through the battery, wherein the check valve only enables the coolant to flow from the battery in the direction of the multi-way valve.

8. The coolant system according to claim 4, wherein the battery subcircuit includes the coolant heater for heating the battery as needed, wherein the coolant heater is arranged downstream of the multi-way valve and upstream of the chiller in the direction of flow, with respect to a flow of the coolant through the chiller, wherein the chiller and the coolant heater are arranged in a common coolant line of the battery subcircuit, and wherein the coolant heater is an electric heater.

9. The coolant system according to claim 3, wherein the coolant system is designed such that, depending on the switching state of the multi way valve, the following coolant-conducting connections are realized via the multi-way valve:

a) coolant conducting connection of the chiller to the battery;

b) coolant-conducting connection of the chiller to the power electronics and the electric motor;

c) coolant conducting connection of the chiller to the cooling air radiator, the power electronics, and the electric motor; and d) coolant-conducting connection of the chiller to the battery, the power electronics, and the electric motor; and e) coolant-conducting connection of the chiller to the battery, the cooling air radiator, the power electronics, and the electric motor.

10. A cooling system for an electric vehicle, the cooling system comprising:

the coolant system according to claim 1; and a refrigerant circuit.

11. The cooling system according to claim 10, wherein the refrigerant circuit is designed to air-condition a passenger compartment of the electric vehicle and/or to control the temperature of a coolant flowing in the coolant circuit.

12. The cooling system according to claim 10, wherein the cooling system is designed such that a heat transfer connection between the coolant system on one side and the refrigerant circuit on the other side are established as needed via the chiller.

13. The cooling system according to claim 10, wherein the cooling system is designed such that a heat transfer connection between the coolant system on one side and the refrigerant circuit on the other side is established as needed via the condenser, and wherein the condenser is arranged in a drivetrain subcircuit so as to conduct coolant.

14. The coolant system according to claim 1, wherein, in the second switching state, in which the chiller is bypassed, the coolant flows through the chiller bypass line, the first coolant pump and the battery, with the first coolant pump being positioned downstream of the chiller bypass line and upstream of the battery.

* * * * *